United States Patent
Hayes, Jr. et al.

(10) Patent No.: US 7,604,472 B2
(45) Date of Patent: Oct. 20, 2009

(54) METHOD AND APPARATUS FOR FORMING FLARED TUBE ENDS

(76) Inventors: Frank F. Hayes, Jr., 1712 M Newport Cir., Santa Ana, CA (US) 92705; Paul E. Crist, 34771 County Road 22, Woodland, CA (US) 95695

( * ) Notice: Subject to any disclaimer, the term of this patent is extended or adjusted under 35 U.S.C. 154(b) by 1403 days.

(21) Appl. No.: 10/618,574

(22) Filed: Jul. 12, 2003

(65) Prior Publication Data

US 2005/0005987 A1 Jan. 13, 2005

(51) Int. Cl.
*B29C 57/02* (2006.01)

(52) U.S. Cl. .................. 425/160; 425/384; 425/393

(58) Field of Classification Search ............... 425/155, 425/160, 162, 384, 392–393
See application file for complete search history.

(56) References Cited

U.S. PATENT DOCUMENTS

| | | | |
|---|---|---|---|
| 3,923,443 A * | 12/1975 | Emery et al. ............... | 425/384 |
| 3,932,094 A * | 1/1976 | Korff et al. ................ | 425/393 |
| 3,949,045 A | 4/1976 | Hess et al. | |
| 4,009,982 A | 3/1977 | Maier | |
| 4,264,661 A | 4/1981 | Brandolf | |
| 4,323,337 A * | 4/1982 | Korff et al. ................ | 425/155 |
| 5,928,451 A * | 7/1999 | Johansson et al. .......... | 425/393 |
| 6,221,189 B1 * | 4/2001 | Kieras et al. ............... | 425/393 |
| 6,328,309 B1 * | 12/2001 | Corbett, Jr. ................ | 425/393 |
| 2001/0002755 A1 | 6/2001 | Rowley | |

FOREIGN PATENT DOCUMENTS

WO WO 89/00492 1/1989

OTHER PUBLICATIONS

Invitation to Pay Additional Fees with Annex Re Partial International Search, dated Dec. 15, 2005 by European Patent Office re International Application No. PCT/US2004/021839.
International Preliminary Report on Patentability re PCT/US2004/021839, mailed Jan. 26, 2006.

* cited by examiner

*Primary Examiner*—Yogendra Gupta
*Assistant Examiner*—Thu Khanh T Nguyen
(74) *Attorney, Agent, or Firm*—Larry K. Roberts

(57) ABSTRACT

A method for forming a flare in the end of a flexible tube comprises heating the end of the flexible tube to a near-melted state, inserting the end of the flexible tube into a flare-forming die with a flare forming portion, and pressing a mandrel into the end of the flexible tube, thereby pressure forming a flare in the end of the flexible tube.

37 Claims, 4 Drawing Sheets

METHOD AND APPARATUS FOR FORMING FLARED TUBE ENDS

BACKGROUND OF THE DISCLOSURE

Flexible and rigid tubing may have formed ends for use in coupling the tube to a fitting or to another tube. Flexible tubing may, for example, have flared ends to be joined to a flexible or rigid tube or fitting. A flared tube may be joined without a bushing and/or a nut. The inner diameter of the flare may be sized to accept and be joined to the outer diameter of a tube or fitting. The end of rigid tubing may be formed into a flare or flange.

In the case of flexible tubing, the ends may be formed into flares using "cold flare" tools or heated flare tools. Cold flare tools use pressure alone to shape a tube end into a flare. Heated flare tools may unevenly heat the end of a tube and may use a flare form inserted into the tube to form a flare. Shaped tube end flares made by these methods may, due to the elastic memory of the tube, lose their shape at normal operating temperatures and pressures. In the case of rigid tubing, the ends may be formed, for example, into flanges by a pressure molding apparatus.

SUMMARY OF THE DISCLOSURE

An exemplary embodiment of a method for forming a flare in the end of a flexible tube comprises heating the end of the flexible tube to a near-melted state, inserting the end of the flexible tube into a flare-forming die with a flare forming portion, and pressing a mandrel into the end of the flexible tube, thereby pressure forming a flare in the end of the flexible tube.

BRIEF DESCRIPTION OF THE DRAWINGS

These and other features and advantages of the invention will readily be appreciated by persons skilled in the art from the following detailed description of an exemplary embodiment thereof, as illustrated in the accompanying drawings, in which.

DETAILED DESCRIPTION OF THE DISCLOSURE

Figure 1:
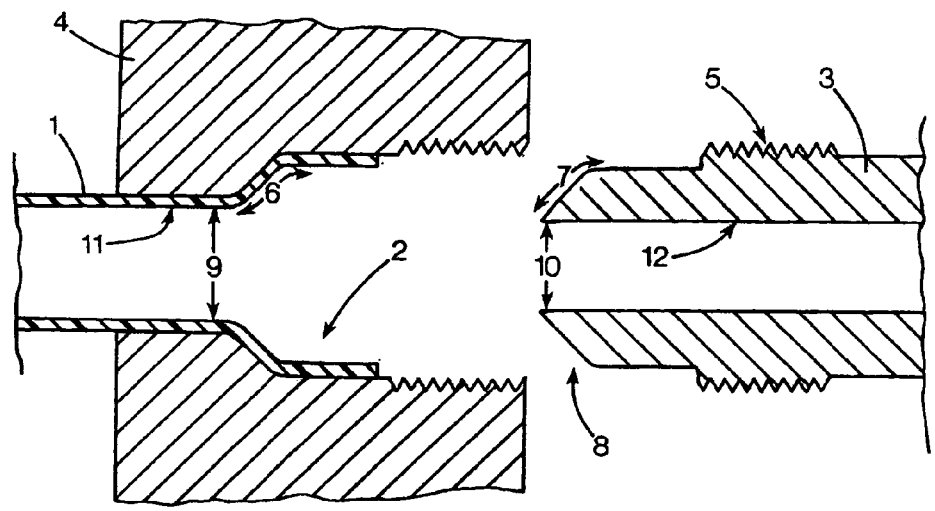
FIG. 1 illustrates a cross-sectional view of an exemplary flared end of a flexible tube and mating end of a fitting.

In the following detailed description and in the several figures of the drawing, like elements are identified with like reference numerals.

A compression formed flared tube end may be used in coupling a flexible tube to a tube, pipe or fitting. FIG. 1 illustrates an exemplary embodiment of a flexible tube 1 with a flared end 2 to be fitted to a mating portion 3. A nut 4 may be provided to mate with threads 5 on the mating portion 3 to secure the fitting. The inner profile 6 of the flared end 2 of the flexible tube 1 may be formed to conform to the profile of the outer surface 7 of the mating end 8 of the mating portion 3. The flexible tube may be selected so that the inner diameter 9 of the flexible tube 3 matches the inner diameter 10 of the mating portion 3 where the interior surface 11 of the flexible tube meets the interior surface 12 of the mating portion 3, which may provide surface continuity along the interior surfaces of the fitting and may reduce the likelihood of leaks or fitting failure. In an exemplary embodiment, the flare is at a 45 degree angle with a 0.060 inch radius.

Figure 2:
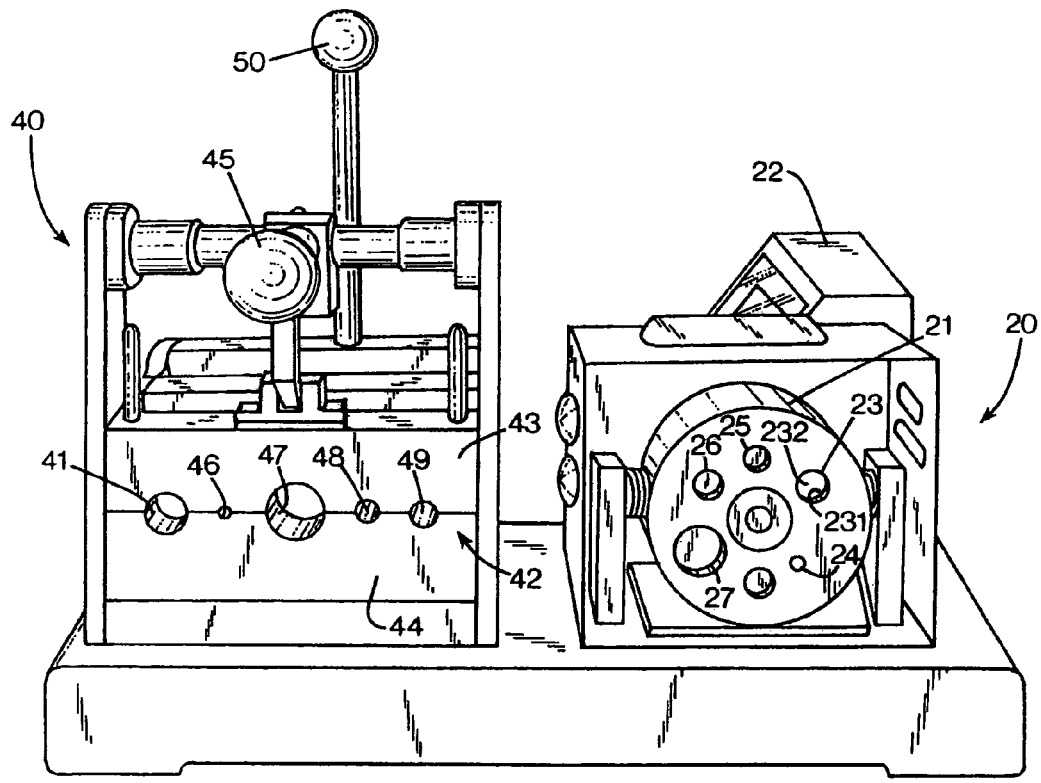
FIG. 2 illustrates an exemplary flare forming system for forming flares in the ends of flexible tubing.

An exemplary embodiment of a compression flare forming system is illustrated in FIG. 2. The exemplary flare forming system comprises a heater 20 and a flare forming apparatus 40. The heater 20 is a contact heater which uniformly heats the end of a flexible tube by contact around its entire circumference in preparation for pressure forming a flare in the tube end. The heater has heating elements (not shown), a heating structure 21 and a controller 22. The heating elements are in thermal contact with the heating structure 21 and may comprise, for example, a plurality of electrically-powered, barrel-shaped resistive heating elements inserted into heat transfer chambers (not shown) in the heating structure 21. An exemplary resistive heating element suitable for the purpose has flat ends and is about ⅝ inch diameter and about 4 inches long. The controller 22 controls the heating elements to bring the heating structure 21 to a desired temperature. Other suitable heating arrangements could alternatively be used to heat the heating structure. Other suitable heating elements may include a blanket-style heating element encompassing the heating structure 21.

The heating structure 21 has a heater receptacle 23 adapted to receive a tube end for contact heating. The heating structure 21 may comprise a plurality of heater receptacles 23-27. Each heater receptacle may be adapted for receiving and heating the ends of tubes of different diameters. In an exemplary embodiment, the heating structure may have heater receptacles 24, 25, 26, 23, 27 adapted for receiving and heating tubes with respective diameters of ¼ inch, ⅜ inch, ½ inch, ¾ inch and 1 inch. The heating structure 21 may comprise aluminum with a nickel-polymer coating. The nickel-polymer coating may help prevent the tube from sticking to the surface of the heater receptacle and may prevent the contamination of the tube end through oxidation of the aluminum. Other suitable coatings for a heating structure may alternatively be employed, for example Teflon or PTFE.

The end of a tube to be shaped in a flare forming apparatus 40 may be inserted into a heater receptacle 23-27 to be heated prior to the tube end being formed. The tube end inserted into a properly-sized receptacle may expand upon heating and be held firmly in place in the receptacle. The tube may be uniformly in contact with the inner surface 231 of the heater receptacles around the circumference of the tube along the length of the tube inside the heater receptacle. This contact heating will provide uniform heating of the entire circumference of the tube throughout the area of the tube to be flared. Uniform heating may result in more consistent flares.

A tube inserted into a tube receptacle may be inserted up to a tube-stop 232 at the end of the receptacle 23. The tube-stop 232 may be at a depth such that the heater will heat the desired length of the tube end for the forming process. This may ensure that the end of the tube will be heated to the desired temperature along a consistent, predictable and desired length. The tube may be heated along a length at least as long as the flare to be formed. The tube end may be heated along a length longer than the length of the flare to be formed. For some tubing, the tubing may be heated to a length extending 10 to 15% beyond the area to be flared and may be heated to a length of up to at least about 30% beyond the area to be flared. In some tubing sizes and wall thicknesses, heating beyond the area to be flared may result in a problem whereby the force of a mandrel being pressed into the end of a tube to be formed is transferred largely longitudinally to the tubing, causing the tube to collapse in an accordion-like manner, instead of being transferred mostly radially outward to form the end of the tube into a flare. In an exemplary embodiment using ¼ inch tubing with a wall thickness of about 0.047 inches, for example, the tube may be heated to a distance of no more than about 0.047 inches beyond the length of the tube end to be flared. The distance beyond which the tube is heated in a given application may depend on the diameter of the tubing, the material comprising the tubing, the thickness of the tube walls and the temperature to which the end of the tube was heated, and the desire to prevent collapsing of the tube wall.

The end of a tube to formed into a flare may be heated to a temperature just below the melting point of the material comprising the tube. The material should be heated to a near-melted state where the tube end is completely softened, pliable and susceptible to being reshaped. Suitable flexible tubing to be pre-heated for forming flared connectors may comprise, for example, plastic materials such as PFA (perfluoroalkoxy), FEP (fluoroethyl propylene) or PVDF (polyvinyldene fluoride). The suitable temperature range for pre-heating flexible tubing prior to compression forming of a flare may be about 480-520 deg. Fahrenheit for PFA, 390-440 deg. Fahrenheit for FEP, and/or about 240-300 deg. Fahrenheit for PVDF.

The heating structure 21 may be brought up to the specified temperature prior to inserting the tubing to be flared. The tubing should be left in the heater receptacle for a time sufficient to heat the tube to the desired temperature. A desired time of heating may be at least about a minimum of thirty seconds or longer. The target temperature and time for heating may depend on the thickness of the walls of the tubing being used, the application for which the tube end is being formed, and the material and consistency of material comprising the tube. Uniform contact heating may result in a substantial reduction in "hot time" (the time during which the tube end temperature is elevated) over non-uniform heating methods, although this may depend on application-specific parameters.

After the tube end to be formed has been heated, the tube end may be removed from the heater receptacle 23 and transferred to a flare forming apparatus 40. The heater 20 and the flare-forming apparatus 40 may be arranged near each other so that a tube removed from the heater will retain sufficient heat during transfer from the heater to the flare-forming apparatus to achieve proper flare forming.

An exemplary tube forming apparatus 40 comprises a tube receptacle 41, a mandrel and a mandrel press (not shown in FIG. 2). The tube receptacle 41 may comprise a clamping portion and a tube end forming portion. The tube receptacle 41 may be formed in a flare forming die 42. The flare forming die may comprise a plurality of parts. In FIG. 2, the exemplary flare forming die 42 comprises a top die half 43 and a bottom die half 44. The two halves 43, 44 may be pressed together to secure the tube by a clamp in the clamping portion of the tube receptacle and to arrange the flare forming portion in the flare forming position. The two halves may be pressed together by a hand-operated lever 45. In an exemplary embodiment, the lever 45 translates rotational motion of the lever 45 into linear motion of the top half 43 of the flare forming die 42 to open the tube receptacle to receive or remove a tube end.

The tube forming apparatus 40 may comprise a plurality of tube receptacles 41, 46-49 formed in the flare forming die 42. The plurality of tube receptacles may be sized and shaped for forming the ends of tubes with sizes and shapes corresponding to the sizes and shapes of heater receptacles on a tube end heater. A lever 50 may also be provided to operate the mandrel press through its stroke distance to compress a tube end to form a flare. In an exemplary embodiment, the lever translates rotational motion of the lever to linear motion of the mandrel press and mandrel to push the mandrel into the tube end to be formed into a flare.

Figure 3:
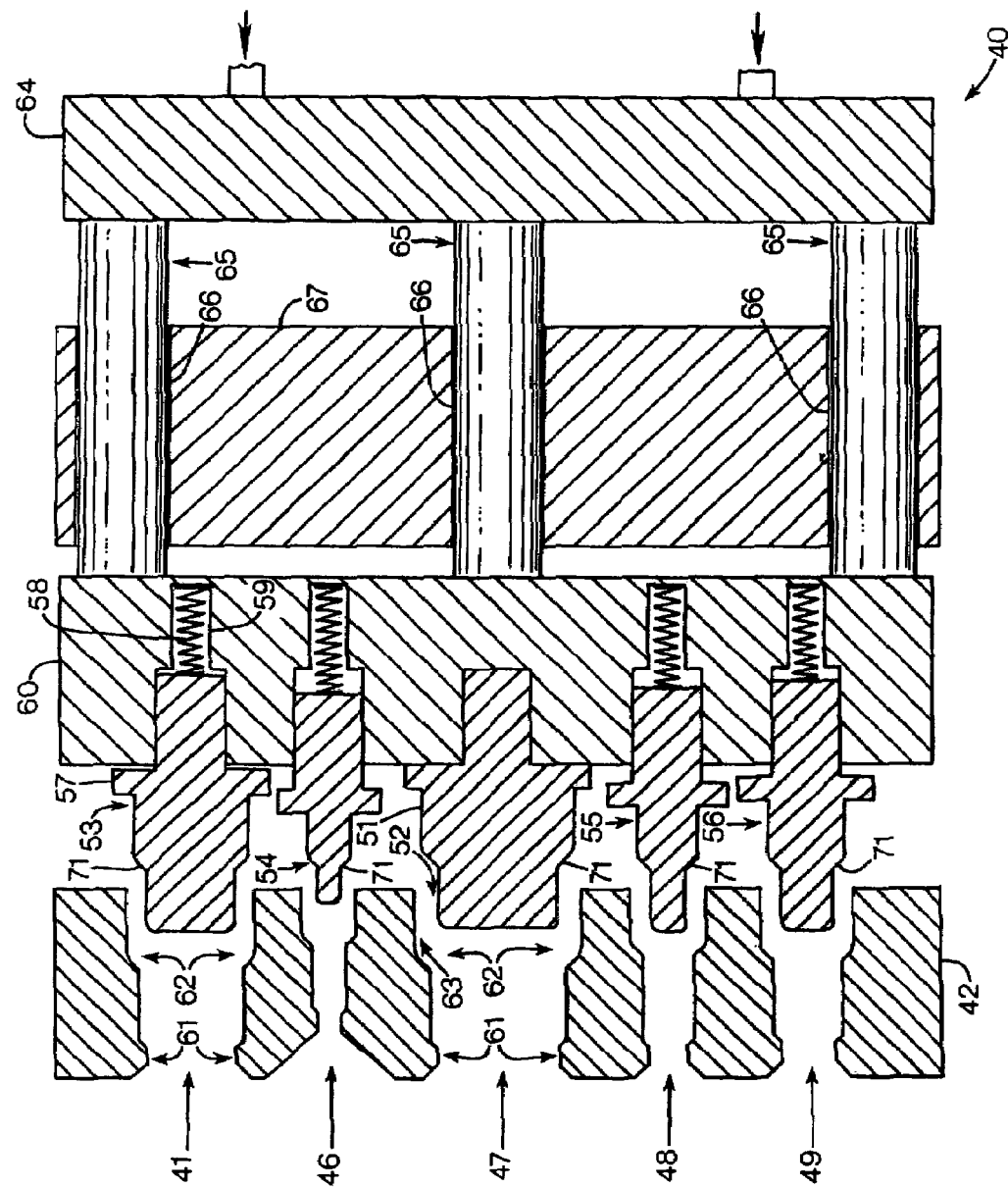
FIG. 3 illustrates a cross-sectional view of an exemplary flare forming apparatus.

FIG. 3 illustrates a cross section of an exemplary embodiment of a flare forming apparatus 40. The flare forming apparatus 40 comprises a flare forming die 42 with a plurality of tube receptacles 41, 46-49. The tube receptacles may comprise a clamping portion 61 and a flare forming portion 62. The flare forming portion 62 of a tube receptacle may, for example, have a profile conforming to the outer diameter of a flare to be formed. The flare forming apparatus 40 comprises a mandrel 51 with a profile 52 conforming to the inner profile of a flare to be formed (which may match a profile 7 of the outside of a mating fitting 3 as shown in FIG. 1) and a mandrel press 60 for pressing the mandrel into the end of a tube.

Figure 4:
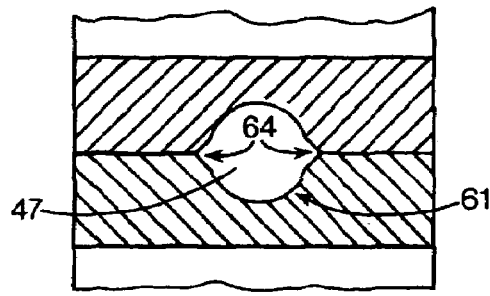
FIG. 4 illustrates a cross-sectional view of an exemplary clamping portion of an exemplary tube receptacle of a flare forming die.

The diameter of a tube receptacle 47 at the clamping portion 61 may be smaller than the outer diameter of a tube to be received in the receptacle. It may be, for example, about 8 to 10 percent smaller than the outside diameter of the tube. When the two flare forming die portions are closed together, for example by movement of the lever 45 (FIG. 2), the narrower, clamping portion of the tube receptacle compresses the tube and secures it in place against forces applied by the mandrel when the mandrel is pressed into the tube. In an exemplary embodiment illustrated in FIG. 4, the tube clamping portion 61 of a tube receptacle may have cut-outs 64 which provide space into which the tube may bulge or deform while under the clamping forces, in order to help prevent damage to the tube. The tube end inserted into the apparatus for forming may have been heated along a length of the tube end such that the portion of the tube in the clamping portion has not been heated to the desired temperature for flare forming so that the tube portion held in the clamping portion of the receptacle will not become permanently deformed.

In the exemplary embodiment of FIG. 3, the flare forming apparatus may comprise a plurality of mandrels 51, 53-56. The mandrels may each comprise a collar 57. The mandrels may be arranged in a mandrel press. The collar may transfer pressure applied against the mandrel from the mandrel press to force the mandrel into a tube to be flared. In the exemplary embodiment of FIG. 3, a mandrel 51 is rigidly affixed to the mandrel press 60. Other mandrels 53-56 are spring-mounted on springs 58 in recesses 59 in the mandrel press 60. The mandrels may each be mounted so that a transitional slope portion 71 of each mandrel is properly positioned to act as a tube stop when inserting the end of a tube to be flared, as discussed further below with respect to FIGS. 5A and 5B. In an exemplary embodiment, the spring mounted mandrels may positioned forward of a rigidly affixed one inch mandrel 51 distances of 0.050 inches for a ¾ inch mandrel 53, 0.100 inch for a ½ inch mandrel 56, 0.150 inch for a ⅜ inch mandrel 55 and 0.200 inch for a ¼ inch mandrel 54.

In an exemplary embodiment, the flare forming die and or the mandrels may comprise material which is inert with respect to the material comprising the flexible tube end to be formed. This may prevent contamination of the tube which may be desirable in some applications. In an exemplary embodiment, the flare forming die and/or the mandrels may have substantial heat capacity and comprise material with good thermal conductivity. This may improve cooling of the tube end during flare formation and may reduce the time required to keep the mandrels pressed forward in the flare forming position reduce the time for the end of the tube to reach a state where it will retain its flared form. In an exemplary embodiment, the flare forming die and the mandrels may comprise stainless steel.

In the exemplary embodiment of FIG. 3, a ram 64 transfers force (for example force applied through the lever 50 in FIG. 2) laterally through ram rods 65 to the mandrel press 60. Force could alternately be applied to the ram 64 by a hydraulic system or electrical motor system. The ram rods 65 are guided through guides 66 through a guide structure 67. In flare forming, the mandrel press is moved through a stroke distance sufficient to push the mandrel into the end of a tube in the receptacle, to deform the heated end of the tube and put sufficient pressure on the heated, deformed end of the tube to form a flare in the end of the tube. The appropriate distance to move a mandrel to form the flare, the flare forming distance, may differ depending on the size of the tubing or the shape of the flare to be formed and the desired location of the tube stop. The spring mounting of the mandrels of different size causes different mandrels to move different flare-forming distances for a given movement of the mandrel press. For example, the mandrel 51 will move the same distance moved by the press during a stroke. The mandrel 53 may initially stay put as the mandrel press is moved, in the event that the tube is placed against the transitional slope portion. The spring 58 may compress as the mandrel press moves until the front face of the mandrel press 60 contacts the collar 57. Then, the collar 57 transfers the lateral forces from the ram to the mandrel and moves the mandrel into the end of the tube to form a flare. The flare forming die 42, mandrel press 60 and mandrels 51, 53-56 may all be designed together so that each mandrel 51, 53-56 moves the desired distance in order to form the desired shape of flare for the appropriate sized tubing in each tube receptacle 41, 46-49.

Figure 5A:
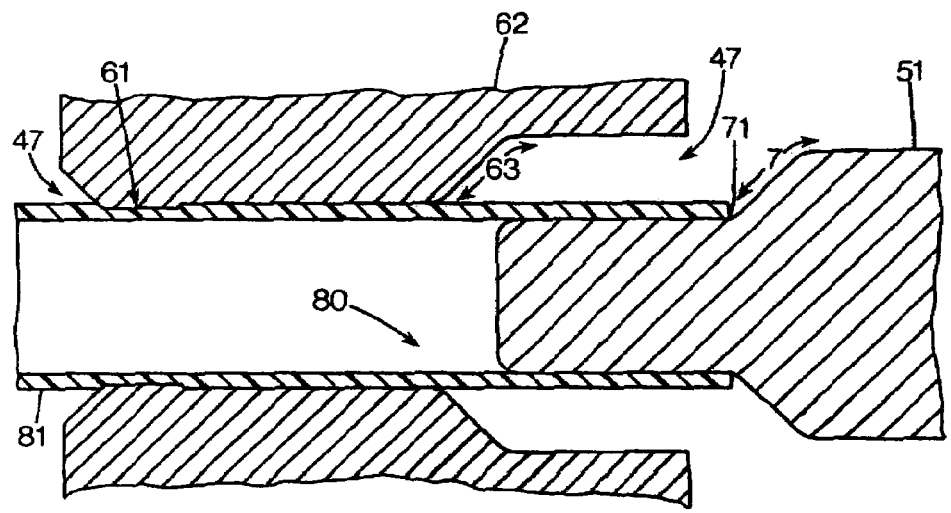
FIG. 5A illustrates a cross-sectional view of an exemplary tube receptacle and mandrel in a preparatory position.
Figure 5B:
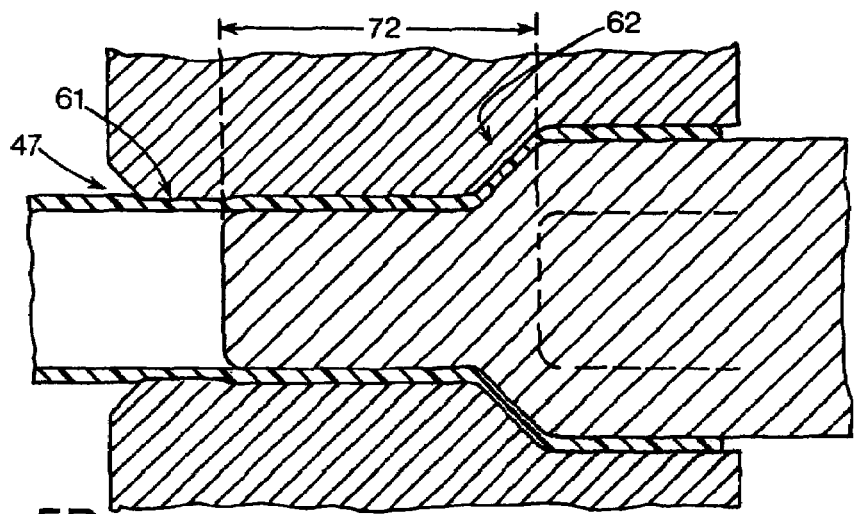
FIG. 5B illustrates a cross-sectional view of an exemplary tube receptacle and mandrel in a flare forming position.

In an exemplary embodiment illustrated in FIGS. 5A and 5B, a pre-heated tube end 80 is placed in a tube receptacle. The tube end 80 extends into the flare forming portion of a tube receptacle. The tube end 80 may extend a short distance beyond the end of the flare forming portion prior to forming the flare (FIG. 5A). A tube stop 71 may be provided to stop the tube at the desired flare-forming location. The tube stop may be provided, for example, by the transitional slope portion 71 of a mandrel 51. In FIG. 5A, the tube 81 has been inserted into the tube receptacle 47 until the tube end 80 abuts the transitional slope portion of the mandrel 51. The mandrel 51 is at the desired position to provide the tube stop at the desired position when the tube forming apparatus is arranged in a preparatory position. The top die half 43 may be raised to facilitate inserting the end of the tube into the tube receptacle. After the tube is placed in the desired position, the top die half 43 may be lowered, thereby clamping the tube in the clamping portion 61 of the flare forming die. After the flare is formed, the top die half may be raised to facilitate removing the tube end from the tube receptacle.

The profile 63 of the flare-forming portion of the tube receptacle has the profile of the outer circumference of the flare to be formed. The flare-forming mandrel 51 is pressed into the heated tube end 80 a desired stroke distance 72 (FIG. 5B) to compress the tube end 81 into the desired flare form. The tube is held in place against the lateral motion of the mandrel by the clamping portion 61 of the tube receptacle 47. The profile 73 of the mandrel is the profile of the inner-circumference of the flare to be formed and may be designed to match the profile 7 of the end of a flare fitting 3 (FIG. 1) for which the flare being formed is intended to be mated. In the flared region of the tubing, the tube thickness may experience a 10-20% reduction from its pre-formed thickness. Due to the forming of the flare, the length of the tube end may decrease such that the tube end 80 is recessed within the tube receptacle 47 after the flare if formed (FIG. 5B).

The mandrel is pressed into the tube end with a pressure sufficient to compression form the end of the tube into a flare. In an exemplary embodiment, the mandrel may be pressed forward into the tube by hand pressure on a lever until cam action locks the mandrel in place in the flare forming position. The mandrel is held in place with sufficient force to reform the tube end into a flare and for a time sufficient for the flared tube end to cool sufficiently for the flare to retain its reformed shape. The mandrel may be held in place in the flare forming position for a time period of at least about a minute or sixty five seconds, for example. The mandrel may be held in place with a force of about ten to fifteen pounds, for example, although this may depend on application-specific parameters.

The pre-heating, combined with the pressure flare forming may create consistent flares which hold their shapes at a wider range of operating temperatures and for longer periods of time. The pressure formed flares may retain their shapes at higher temperatures and for longer periods of time than cold formed flares or heat-formed/non-compression formed flares. Cold formed and heat-formed/non-compression formed flares may revert to their pre-formed shapes when heated to temperatures above, for example 200 deg. F. In the case of PFA, FEP, PVDF, for example, pressure formed flares may tend to retain their shapes at typical operating temperatures, sometimes exceeding 200 degrees.

The flare formed in the tubing may have an outer flare inner circumference, an inner tubing circumference and an inner sloped profile from the outer flare inner circumference to the inner tubing circumference. The outer flare inner circumference can be formed to match the outer circumference of a fitting with which the tubing is to be mated to achieve a tight fit and seal. The slope or profile of the flare may be formed to match the outer profile of the end of a fitting with which the tube is to be mated. The inner tubing circumference may be chosen to match the inner circumference of the fitting with which the tubing is to be mated. By carefully matching the outer flare circumference, slope profile and inner tubing circumference with the outer circumference, tube end profile and inner circumference of a flare with which the flared tubing is to be mated, a tight seal may be formed. Where the fittings with which flared tubing is to be mated has been fully molded to a consistent size and profile, the flare forming apparatus can create matched flare connections which consistently mate with the molded fittings. The tight fit may provide a smooth through-bore in the connection, reduce turbulent flow within the system and may reduce the likelihood of leaks or fitting failures. The matched flare fitting may also prevent "cold flowing" (deformation of a fitting and/or tube flare from over tightening due to poor interface on an unmatched flare) and reduce or eliminate "entrapment areas" (gaps at the flare/fitting interface). A pressure formed flare connection may provide full engagement between the tube and fitting and may have at least about 90-95% surface engagement between the flare and fitting.

Figure 6:
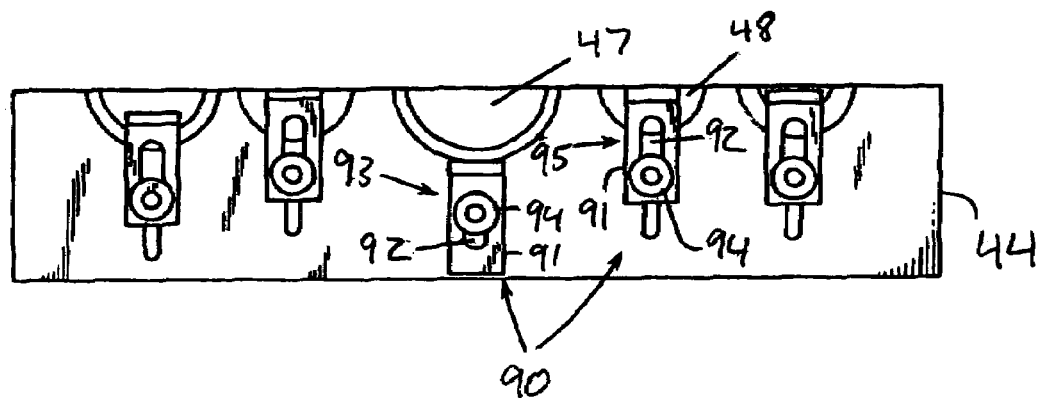
FIG. 6 illustrates an exemplary bottom die half of a flare forming die with exemplary tube receptacle lock out devices.

In a tube end forming apparatus with a plurality of different-shaped tube receptacles, the entrance to the tube receptacles may be provided with a lock out device. The lock out device may prevent inserting a tube into a tube receptacle that is not to be used. In a manufacturing environment, it may be desirable to shape the ends of a number of like-sized tubes one after the other, without using the other sized receptacles. Prior to forming the ends of the tubes, the lock-out devices for each of the other tube receptacles may be put in place to prevent an operator from inadvertently placing a tube into an improperly-sized tube receptacle. This may reduce manufacturing errors and result in an increase in operating efficiency. A lock-out device may comprise a structure adapted to be selectively placed in front of at least a portion of the entrance to a tube receptacle. In an exemplary embodiment illustrated in FIG. 6, a lock-out device comprises a lock-out structure with an elongated aperture 92. The lock-out structure 91 may be held in place in a position outside the entrance 93 to a tube receptacle 47 by a screw 94 arranged through the aperture 92 or held in a position in front of the entrance 95 of a tube receptacle 46 by a screw 94. The lock-out device illustrated in FIG. 6 may be mounted, for example, on one half the flare forming die which may be the bottom die half 44. A lock-out device may comprise any other suitable structure which can block the entrance to a tube receptacle.

Figure 7:
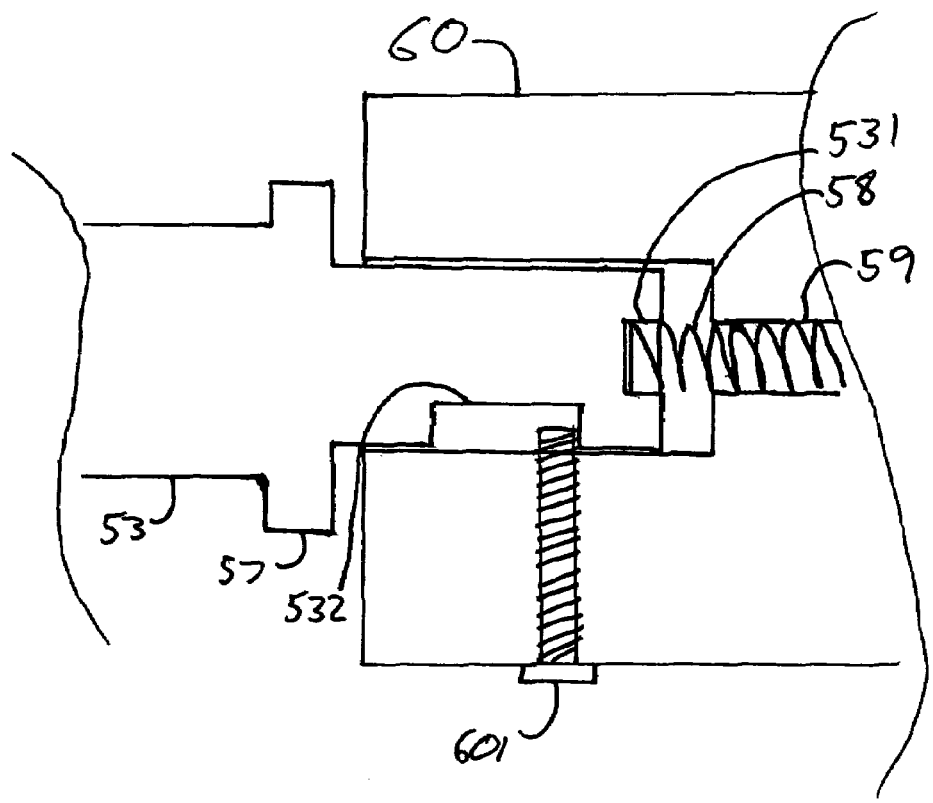
FIG. 7 illustrates a cross-sectional view of an exemplary embodiment of a mandrel arranged in a mandrel press.

Spring-loaded mandrels (53-56 in FIG. 3) may be held in place at the proper distance forward of the rigidly mounted mandrel (51 in FIG. 3) using a set screw or bolt. FIG. 7 illustrates an exemplary embodiment of a mandrel 53 arranged in a mandrel press 60. The mandrel 53 is spring mounted on a spring 58 arranged in a recess 59 in the mandrel press 60 and a recess 531 in the mandrel 53. The spring 58 is compressed and puts a force on the mandrel tending to push the mandrel away. A set screw or bolt 601 is screwed into the mandrel press 60, and may be screwed into the bottom of the mandrel press. The end of the set screw 601 extends into a recess 532 into the mandrel 53. The recess may be in the form of a slot. The compressive force of the spring 58 pushes the mandrel out until the rear wall of the recess 532 meets the end of the set screw 601. The set screw 601 and the recess 532 are sized and arranged so that the mandrel 53 is held in the proper position so that a transitional slope of the mandrel may act as a tube stop when the mandrel press is in a preparatory position. The recess 532 or slot may be long enough so that the set screw 601 does not meet the front wall of the recess 532 as the mandrel press is moved forward through a stroke to form a flare in the end of a flexible tube. In an exemplary embodiment, the set screw 601 or bolt may protrude into the recess 532 by about 0.100 inches. The bolt may be a 0.190 inch diameter bolt and the recess 532 may be a slot about 0.200 inches wide. The slot may have a length equal to at least the diameter of the bolt plus the distance travelled by the mandrel press during a stroke.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A system for forming a flared end of a flexible tube, comprising:
 a heater comprising a contact heating structure with a contact heating surface for contacting and heating an entire circumference of an end of the tube and wherein the remainder of the flexible tube remains unheated;
 a flare forming die including a clamp for clamping an unheated portion of the flexible tube adjacent the heated end of the tube; and
 a mandrel.

2. The flare forming system of claim 1, wherein the heater comprises a contact heating receptacle adapted for uniformly contact heating the circumference of the end of a flexible tube.

3. The flare forming system of claim 1, wherein the heater comprises a heater structure, a heating element in thermal contact with the heater structure comprising a contact heating receptacle, and a controller to control the heating element to heat the heater structure to a desired temperature.

4. The flare forming system of claim 3, wherein the heater structure comprises a plurality of contact heating receptacles.

5. The flare forming system of claim 4, wherein the plurality of contact heating receptacles comprises heating receptacles adapted for receiving a plurality of sizes of ends of flexible tubes.

6. The flare forming system of claim 1, wherein the flare forming die comprises a tube receptacle comprising a clamping portion and a flare forming portion, said clamping portion for providing said clamp for clamping said unheated portion of the flexible tube.

7. The flare forming system of claim 1, wherein the flare forming die comprises a top die unit and a bottom die unit which form a plurality of tube receptacles.

8. The flare forming system of claim 7, comprising:
 a plurality of mandrels.

9. The flare forming system of claim 1, comprising:
 a plurality of mandrels arranged on a mandrel press.

10. The flare forming system of claim 9, comprising:
 at least a first mandrel spring mounted on the mandrel press to apply an axial spring compressive force to bias an axial position of the first mandrel relative to the mandrel press.

11. The flare forming system of claim 10, comprising:
 a second mandrel, rigidly mounted on the mandrel press.

12. The flare forming system of claim 1, wherein:
 the heater comprises a plurality of contact heating receptacles adapted to receive and contact heat flexible tubes in a plurality of different sizes;
 the flare forming die comprises a plurality of tube receptacles adapted to receive flexible tubes in the plurality of different sizes; and
 the mandrel is one of a plurality of mandrels arranged in a mandrel press, the plurality of mandrels being adapted for forming flares in the ends of flexible tubes in the plurality of different sizes.

13. The flare forming system of claim 12, comprising:
 a first mandrel spring mounted on the mandrel press by a spring applying an axial force on the first mandrel, and a second mandrel, rigidly mounted on the mandrel press.

14. The flare forming system of claim 13, wherein the first mandrel and the second mandrel are each in respective tube stop positions when the mandrel press is in a preparatory position, the first mandrel positioned at its tube stop position by said spring.

15. The flare forming system of claim 13, wherein the first mandrel and the second mandrel each move through respective flare forming distances when the mandrel press is moved through a flare forming stroke.

16. The flare forming system of claim 7, comprising a tube receptacle lock-out device to prevent insertion of a tube into one of said plurality of tube receptacles that is not to be used.

17. The system of claim 1, wherein said contacting surface is fabricated of a material selected to prevent the tube end from sticking to said surface and prevent contamination of the tube.

18. A system for forming a flared end of a flexible tube fabricated of a plastic material, comprising:

a heater comprising a contact heating structure with a contact heating surface for contacting and heating an entire circumference of an end of the tube and wherein the remainder of the flexible tube remains unheated:

a compression flare forming apparatus comprising a flare forming die including a clamp for clamping an unheated portion of the flexible tube adjacent the heated end of the tube, a mandrel and a mandrel press, and wherein the plastic material comprises one of PFA (perfluoroalkoxy), PVDF (polyvinyldene fluoride) or FEP (fluoroethyl propylene), and the heater is configured to heat the surface to a suitable temperature range for preheating said plastic material of said end of said flexible tubing prior to compression forming of a flare.

19. The system of claim 1, wherein the flare-forming die and mandrel are not actively heated or cooled.

20. The system of claim 1, wherein the portion of the mandrel inserted into the end of the flexible tube is a one-piece mandrel.

21. A system for forming a flared end of a flexible tube, comprising:

a heater comprising a contact heating structure with a contact heating surface for contacting and heating an entire circumference of an end of the tube and wherein the remainder of the flexible tube remains unheated;

a compression flare forming apparatus comprising a flare forming die including a clamp for clamping an unheated portion of the flexible tube adjacent the heated end of the tube, a mandrel and a mandrel press; and wherein the heater and compression flare forming apparatus are separate structures arranged in a spaced manner and near each other so that a tube removed from the heater will retain sufficient heat during transfer from the heater to the flare forming apparatus to achieve desired flare forming.

22. The system of claim 21, wherein the flare forming die and the mandrel have substantial heat capacity and are fabricated of material with good thermal conductivity, to facilitate cooling of the tube end during flare formation and with the mandrel pressed in the die in a flare forming position, thereby reducing a flare formation time for the end of the tube to reach a state where it will retain its flared form.

23. The system of claim 21, wherein the flare forming die and the mandrel are fabricated from a material which is inert with respect to the flexible tube end.

24. The system of claim 21, wherein the flare-forming die and the mandrel are not actively heated or cooled.

25. The flare forming system of claim 21, wherein the heater comprises a contact heating receptacle adapted for uniformly contact heating the circumference of the end of a flexible tube.

26. The system of claim 21, wherein the heater comprises a heater structure, a heating element in thermal contact with the heater structure comprising a contact heating receptacle, and a controller to control the heating element to heat the heater structure to a desired temperature.

27. The system of claim 26, wherein the heater structure comprises a plurality of contact heating receptacles.

28. The system of claim 27, wherein the plurality of contact heating receptacles comprises heating receptacles adapted for receiving a plurality of different sizes of ends of flexible tubes.

29. The system of claim 21, wherein the flare forming die comprises a tube receptacle comprising a clamping portion and a flare forming portion, said clamping portion for providing said clamp for clamping said unheated portion of the flexible tube.

30. The system of claim 21, wherein the flare forming die comprises a top die unit and a bottom die unit which form a plurality of tube receptacles.

31. The system of claim 30, comprising:

a plurality of mandrels arranged on the mandrel press.

32. The flare forming system of claim 31, comprising:

at least a first mandrel spring mounted on the mandrel press to apply an axial spring compressive force to bias an axial position of the first mandrel relative to the mandrel press.

33. The system of claim 21, wherein:

the heater comprises a plurality of contact heating receptacles adapted to receive and contact heat flexible tubes in a plurality of different sizes;

the flare forming die comprises a plurality of tube receptacles adapted to receive flexible tubes in the plurality of different sizes; and the mandrel is one of a plurality of mandrels arranged in a mandrel press, the plurality of mandrels being adapted for forming flares in the ends of flexible tubes in the plurality of different sizes.

34. The system of claim 33, comprising:

a first mandrel spring mounted on the mandrel press by a spring applying an axial force on the first mandrel, and a second mandrel, rigidly mounted on the mandrel press.

35. The system of claim 34, wherein the first mandrel and the second mandrel are each in respective tube stop positions when the mandrel press is in a preparatory position, the first mandrel positioned at its tube stop position by said spring.

36. The system of claim 34, wherein the first mandrel and the second mandrel each move through respective flare forming distances when the mandrel press is moved through a flare forming stroke.

37. The system of claim 30, comprising a tube receptacle lock-out device to prevent insertion of a tube into one of said plurality of tube receptacles that is not to be used.

* * * * *